*US008711822B2*

United States Patent
De Vega De La Red

(10) Patent No.: US 8,711,822 B2
(45) Date of Patent: Apr. 29, 2014

(54) MOBILITY MANAGEMENT IN A COMMUNICATIONS SYSTEM

(75) Inventor: Vicente De Vega De La Red, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 259 days.

(21) Appl. No.: 13/262,849

(22) PCT Filed: Apr. 8, 2009

(86) PCT No.: PCT/EP2009/054224

§ 371 (c)(1),
(2), (4) Date: Oct. 4, 2011

(87) PCT Pub. No.: WO2010/115461
PCT Pub. Date: Oct. 14, 2010

(65) Prior Publication Data
US 2012/0020347 A1 Jan. 26, 2012

(51) Int. Cl.
*H04W 4/00* (2009.01)
*H04W 8/12* (2009.01)

(52) U.S. Cl.
CPC ....................................... *H04W 8/12* (2013.01)
USPC ......................................................... 370/338

(58) Field of Classification Search
USPC ............ 370/338, 328, 331; 455/435.1–435.3, 455/432.1–433, 436–444
See application file for complete search history.

(56) References Cited

U.S. PATENT DOCUMENTS 7,855,991 B2 * 12/2010 Hu ................................. 370/331
8,144,665 B2 * 3/2012 Hu et al. ........................ 370/331

(Continued)

FOREIGN PATENT DOCUMENTS

CN 2008 1 0006802 * 1/2008
CN 2008 1 0008444 * 1/2008

(Continued)

OTHER PUBLICATIONS

"Provide combo node indication to US after ISR activation for combo MME/SGSN deployment" S2-092218, 3GPP TSG-SA2 Meeting 72, Apr. 2009.*

(Continued)

*Primary Examiner* — Mark Rinehart
*Assistant Examiner* — Kenneth P Hunt
(74) *Attorney, Agent, or Firm* — Nixon & Vanderhye P.C.

(57) ABSTRACT

A method of managing subscriber mobility within a telecommunications system having at least first and second access domains supporting respective different access technologies. Each of the access domains comprises one or more mobility management gateways responsible for mobility management within the access domain. The method comprises receiving at a first subscriber server within said system, an update location request from a mobility management gateway within said first access domain, the first subscriber server being responsible for said first access domain. A common user database is then updated to update a profile of a subscriber to which said update location request relates in order to record said mobility management gateway within said first access domain as a current location of the subscriber. At said common user database, a notification rule set is applied to the subscriber profile to determine whether or not a notification to cancel a location for said subscriber must be sent to a mobility management gateway within said second access domain. If so, then a notification is sent from said common user database to a second subscriber server within said system, the second subscriber server being responsible for said second access domain. The notification is received at said second subscriber server, and a cancel location request sent to said mobility management gateway within said second access domain. A further update of said subscriber profile in the common user database is performed to remove said mobility management gateway within said second access domain as a current location of the subscriber.

15 Claims, 10 Drawing Sheets

(56) References Cited

U.S. PATENT DOCUMENTS

| | | | |
|---|---|---|---|
| 8,416,744 B2* | 4/2013 | Becker et al. | 370/331 |
| 2004/0162068 A1* | 8/2004 | Lamb et al. | 455/432.1 |
| 2009/0047952 A1* | 2/2009 | Giaretta et al. | 455/435.1 |
| 2009/0055899 A1* | 2/2009 | Deshpande et al. | 726/4 |
| 2011/0110308 A1* | 5/2011 | Liang et al. | 370/328 |
| 2012/0246255 A1* | 9/2012 | Walker et al. | 709/208 |

FOREIGN PATENT DOCUMENTS

| | | | |
|---|---|---|---|
| CN | 2008 1 0087515 | * | 3/2008 |
| CN | 101400122 A | * | 4/2009 |

OTHER PUBLICATIONS

Abstract, English, CN 101400122 A.*

"Idle State Signalling Reduction," TD S2-074401, 3GPP TSG SA WG2 Meeting 60, Nokia Siemens Networks, Oct. 2007.*

"Corrections to ISR Description," S2-091211, 3GPP TSG SA WG2 Meeting 71, Qualcomm Europe, Feb. 2009.*

"Provide combo node indication to UE after ISR activation for combo MME/SGSN deployment" S2-092218, 3GPP TSG-SA2 Meeting 72, Apr. 2009.*

"Signaling Reduction in Idle Mode for Inter-Technology Mobility" Kalyanasundaram et. al., IEEE 5th Vehicular Technology Conference, Apr. 2007.*

International Search Report for PCT/EP2009/054224, mailed Jan. 26, 2010.

International Preliminary Report on Patentability for PCT/EP2009/054224, mailed Jul. 15, 2011.

Nokia Siemens Networks et al., "Idle State Signalling Reduction", 3GPP Draft; S2-074401, $3^{rd}$ Generation Partnership Project (3GPP), Mobile Competence Centre, vol. SA WG2, No. Kobe; Oct. 2007, 4 pages.

Huawei et al., "Provide combo node indication to UE after ISR activation for combo MME/SGSN deployment", 3GPP Draft; S2-092218, $3^{rd}$ Generation Partnership Project (3GPP), Mobile Competence Centre, Mar. 2009, 23 pages.

Qualcomm Europe, "Corrections to ISR description", 3GPP Draft; S2-091311 (ISR), $3^{rd}$ Generation Partnership Project (3GPP), Mobile Competence Centre; 650, Route Des Lucioles; Feb. 2009, 8 pages.

3GPP TS 23.401 v8.1.0 (Mar. 2008), 3rd Generation Partnership Project; Technical Specification Group Services and System Aspects; GPRS Enhancements for E-UTRAN access (Release 8), pp. 1-171.

3GPP TS 23.060 v8.0.0 (Mar. 2008), "$3^{rd}$ Generation Partnership Project; Technical Specification Group Services and System Aspects; General Packet Radio Service (GPRS); Service description; Stage 2" (Release 8), pp. 1-218.

3GPP TS 29.002 v8.4.0 (Dec. 2007), "3rd Generation Partnership Project; Technical Specification Group Services and System Aspects; General Mobile Application Part (MAP) specification" (Release 8), pp. 1-913.

* cited by examiner

US 8,711,822 B2

MOBILITY MANAGEMENT IN A COMMUNICATIONS SYSTEM

This application is the U.S. national phase of International Application No. PCT/EP2009/054224 filed 8 Apr. 2009 which designated the U.S., the entire content of which is hereby incorporated by reference.

TECHNICAL FIELD

The invention relates to subscriber mobility management in a communications system and in particular to subscriber mobility management in a communications system comprising two or more different packet access networks between which subscribers may roam or otherwise handover.

BACKGROUND

In a mobile communications system such as a cellular telecommunications system, some form of mobility management is required to handle a subscriber's geographical movement. Mobility management provides functionality to keep track of a subscriber so that he or she can be reached in the network regardless of their geographical location. It also ensures that a session is maintained during geographical movements and different load conditions, preferably in a manner that is seamless front eh end user's perspective.

FIG. 1 illustrates schematically a conventional 2G (GSM) system architecture. A Home Location Register (HLR) acts as a central database that contains details of each mobile phone subscriber that is authorized to use the GSM network, including subscribers' current locations; a Visitor Location Register (VLR) identity in the case of circuit switched access, and Serving GPRS Support Node (SGSN) identity in the case of packet switched access. When a subscriber attaches to the GPRS core network and a SGSN is allocated to the subscriber, the SGSN sends an Update Location request to the HLR (via the Gr interface) to cause the subscriber's profile within the HLR to be updated with the new location (SGSN identity). The SGSN maintains a knowledge of the current location of a subscriber.

FIG. 2 illustrates schematically a conventional 2G/3G system architecture, from which it will be appreciated that the SGSN and HLR of the 2G system are reused.

Work is ongoing within the Third Generation Partnership to specify a fourth generation mobile communication system architecture known as Long Term Evolution (LTE).

FIG. 3 illustrates the LTE system architecture, including an evolved UMTS Radio Access Network (e-UTRAN) and an Evolved Packet Core (EPC) network. Unlike the 3G architecture, LTE does not reuse either the HLR or the SGSN. Rather, a new mobility management entity node, the MME, is introduced into the e-UTRAN, whilst a Home Subscriber Server (HSS) replaces the functionality of the HLR in the EPC. The MME and the HSS communicate via the S6a interface. Like the SGSN, the MME maintains a knowledge of the current location of a subscriber on the cell level.

It is worthy of note here that the term HSS may also be used in the context of 2G/3G access, to indicate an HLR with added functionality, e.g. IP Multimedia Subsystem (IMS) functionality. However, for the purpose of the following discussion, the central subscriber database within the 2G/3G access is referred to as an "HLR", whilst that within the LTE access is referred to as an "HSS".

In order to allow LTE subscribers to make use of 2G/3G services (e.g. in geographic locations where LTE is not available), seamless mobility between the different technologies should be available. This requires inter-operability between the HLR and the HSS. This means that the target mobility management entity (that is the SGSN or MME to which the subscriber is to be handed over to) must be able to inform the HLR—in the case where the target entity is an SGSN—or the HSS—in the case where the target entity is an MME—of the change of user location by sending an Update Location to the HLR/HSS. Upon reception of Update Location, the HLR/HSS must send a Cancel Location to the old mobility management entity to cause the entity to delete the location entry for the subscriber in question. This is required in order to release the associated packed switched bearer in the old access network.

The HLR and HSS vertical solutions will likely evolve to an HLR and HSS built on a data layered architecture that separates data from application logic. This is illustrated schematically in FIG. 4. The HLR and HSS layered architecture provides centralisation of user and subscription data. The user and subscription data are stored in a back-end centralised user database (CUDB), with the front-end servers (HLR-S and HSS-S) supporting the application logic. The front-end servers are "dateless" configured and implement mechanisms to read the data from the back-end CUDB for service execution, and to update the CUDB with dynamic changes in the subscriber profiles arising for traffic reasons, e.g. user status, user location, or as a consequence of subscriber procedures initiated form a user terminal.

A function know as Idle mode Signalling Reduction (ISR), 3GPP TS 23.401, provides a mechanism to limit signalling during inter-radio access technology (inter-RAT) cell reselection (i.e. a handover between a 2G/3G RAT and a LTE RAT) in idle mode. Such a functionality is desirable as it is expected that, at least in the initial rollout phase, LTE access will be limited to relatively small "hot spots" and as such inter-RAT handovers will be frequent. Maintaining 2G/3G bearers for a relatively short period will consume fewer network resources than would performing frequent inter-RAT handovers.

Though the ISR solution is not fully settled, from the HLR/HSS perspective, ISR support means that a subscriber can be simultaneously registered at the HLR in respect of a given Rel-8 compliant SGSN and at the HSS in respect of a given MME. Rel-8 compliant SGSNs and MMEs are preconfigured with a knowledge of their support for ISR.

According to ISR, when the subscriber moves between RATs, he/she remains registered in both domains. When for example the subscriber moves from a Rel-8 SGSN to an MME, the MME sends an Update Location to the HSS indicating that ISR applies. Consequently, the HLR/HSS does not send a Cancel Location to the SGSN. When the user moves back to the Rel-8 SGSN and ISR applies, the SGSN does not send an Update GPRS Location to the HLR/HSS. Pre-Rel-8 SGSNs do not support ISR. In the case of a handover involving such a legacy SGSN, or a handover between SGSN or MMEs, the Cancel Location is still required. FIGS. 5 and 6 illustrate respectively signalling associated an inter-MME handover and an inter-SGSN handover.

It is expected that combined SGSN/MME entities will be introduced into networks to replace or supplement the separate SGSN/MME entities. In this case, where a subscriber is handed over from either the MME or the SGSN part to the other part of the combined entity, following the sending of an Update Location from the combined entity to the HLR/HSS, it will not be necessary for the HLR/HSS to return a Location Cancel to the entity as the entity is already aware of the handover.

Regardless of whether or not ISR applies, it is necessary for the HLR and the HSS to inter-work. However, no such procedures have been defined. Whilst the Gr or S6a interface could be re-used for this purpose, any such solution would likely result in a complex and inefficient network architecture, with unnecessary signalling and functionality being replicated in both entities.

SUMMARY

According to a first aspect of the present invention there is provided a method of managing subscriber mobility within a telecommunications system having at least first and second access domains supporting respective different access technologies. These domains may be, for example, a 2G/3G domain and a LTE domain. Each of the access domains comprises one or more mobility management gateways responsible for mobility management within the access domain.

The method comprises receiving at a first subscriber server within said system, an update location request from a mobility management gateway within said first access domain, the first subscriber server being responsible for said first access domain. A common user database is then updated to update a profile of a subscriber to which said update location request relates in order to record said mobility management gateway within said first access domain as a current location of the subscriber. At said common user database, a notification rule set is applied to the subscriber profile to determine whether or not a notification to cancel a location for said subscriber must be sent to a mobility management gateway within said second access domain. If so, then a notification is sent from said common user database to a second subscriber server within said system, the second subscriber server being responsible for said second access domain. The notification is received at said second subscriber server, and a cancel location request sent to said mobility management gateway within said second access domain.

A further update of said subscriber profile in the common user database is performed to remove said mobility management gateway within said second access domain as a current location of the subscriber.

One of said first and second access domains may support a packet switched access technology and the other of said first and second access domains may support a packet switched access technology or a circuit switched access technology.

Alternatively, both said first and second access domains may support a packet switched access technology. In this case, one of said first and second access domains may support a 2G/3G packet switched access technology and the other of said first and second access domains may supports a LTE-based packet switched access technology. Said mobility management gateway within said first access domain may be one of a Serving GPRS Support Node and a Mobility Management Entity, and said mobility management gateway within said second access domain may be the other of a Serving GPRS Support Node and a Mobility Management Entity.

Said first subscriber server may be one of a Home Location Register and a Home Subscriber Server, and said second subscriber server may be the other of a Home Location Register and a Home Subscriber Server, the Home Location Register and the Home Subscriber Server being configured in a layered architecture with said common user database.

The notification rule set may include an Idle mode Signalling Reduction rule or rules directing that no cancel location request be sent to said mobility management gateway within said second access domain if that gateway supports Idle mode Signalling Reduction.

According to the proposed method, the notification rule set that is applied may include at least the following rules:

a) if the address of said mobility management gateway within said second access domain is contained within said profile, and b) Idle Mode Signalling Reduction does not apply, and c) said mobility management gateways within said first and second access domains are standalone nodes, then send a notification to said second subscriber server;

if one or more of a), b) and c) are false or otherwise not applicable, then do not send a notification to said second subscriber server.

According to a second aspect of the present invention there is provided apparatus configured to provide a common user database for storing profiles of respective subscribers of a telecommunications system. The apparatus comprises a subscriber profile database and an interface for communicating with a first subscriber server, the first subscriber server being responsible for subscriber mobility within a first access domain supporting a first access technology, and with a second subscriber server, the second subscriber server being responsible for subscriber mobility within a second access domain supporting a second access technology.

The apparatus further comprises a profile controller responsive to receipt of a profile modification request from said first subscriber server, via said interface, and pertaining to a subscriber being handed over from said second to said first access domain, to update, in said subscriber profile database, a profile of said subscriber in order to record a mobility management gateway within said first access domain as a current location of the subscriber, and a notification controller for applying a notification rule set to the subscriber profile to determine whether or not a notification to cancel a location for said subscriber must be sent to a mobility management gateway within said second access domain and, if so, for sending a notification via said interface to said second subscriber server to cause a cancel location request to be sent to said mobility management gateway within said second access domain.

The notification rule set may comprise at least the following rules:

a) if the address of said mobility management gateway within said second access domain is contained within said profile, and b) Idle Mode Signalling Reduction does not apply, and c) said mobility management gateways within said first and second access domains are standalone nodes, then send a notification to said second subscriber server;

if one or more of a), b) and c) are false or otherwise not applicable, then do not send a notification to said second subscriber server.

The notification rule set applied by the notification controller may include an Idle mode Signalling Reduction rule or rules directing that no cancel location request be sent to said mobility management gateway within said second access domain if that gateway supports Idle mode Signalling Reduction.

The profile controller may be further responsive to receipt of a profile modification request from said second subscriber server, via said interface and following the sending of a said notification from the apparatus to said second subscriber server, to update, in said subscriber profile database, a profile of said subscriber in order to cancel a mobility management gateway within said second access domain as a current location of the subscriber.

The interface may be configured to communicate with said first subscriber server as one of a Home Location Register of a 2G/3G packet access domain and a Home Subscriber Server of a LTE packet access domain, and with said second subscriber server as the other of a Home Location Register of a 2G/3G packet access domain and a Home Subscriber Server of a LTE packet access domain.

According to a third aspect of the present invention there is provided apparatus configured to provide a subscriber server responsible for mobility management of subscribers within a first access domain supporting a first access technology. The apparatus comprises a first interface for communicating with a mobility management gateway within said first access domain and a second interface for communicating with a common user database storing subscriber profiles. A mobility management controller is provided for receiving from said common user database, via said second interface, a notification that a subscriber is being handed off to a mobility management entity within a second access domain supporting a second access technology, and for responding by sending a cancel location request in respect of said subscriber to said mobility management gateway within said first access domain, via said first interface.

The mobility management controller may be further responsive to receipt of said notification to modify a subscriber profile stored at said common user database, via said second interface, by deleting said mobility management gateway within said first access domain. The apparatus may be, according to one embodiment, a Home Location Register of a 2G/3G access domain and, according to a second embodiment, a Home Subscriber Server of a LTE access domain.

DETAILED DESCRIPTION

As has been discussed above, a Home Location Register (HLR) serves 2G and 3G access whilst a Home Subscriber Server (HSS) serves LTE access. Handling mobility management in a system comprising both 2G/3G and LTE access requires inter-working between the HSS and the HLR. It is proposed here to facilitate this inter-working via a notification mechanism implemented at a back-end centralised user database (CUDB). When the CUDB receives a (subscriber profile) modify request from one of the HLR and HSS servers in respect of a subscriber's location, the CUDB will apply a notification rules set to determine what action to take. Table 1 below illustrates an example rules set installed at and applied by the CUDB. For example, the rule defined in the first row of the table states that, in the event that the CUDB receives (from the HLR-S) a modify request containing a new SGSN location for a given subscriber, and the current profile for the subscriber indicates that (1) an MME address location is currently registered, (2) that ISR does not apply, and (3) that the MME and SGSN entities are standalone entitles (i.e. not merged), a notification must be sent to the HSS-S containing a notification reason (i.e. new SGSN address registered), an identity of the subscriber concerned (i.e. the subscriber's International Mobile Subscriber Identity—IMSI), and the address of the currently registered MME. According to this approach, no direct interface between the HLR and the HSS is required. The existing interfaces between the HLR and HSS on the one side, and the CUDB on the other, are reused.

Figure 7:
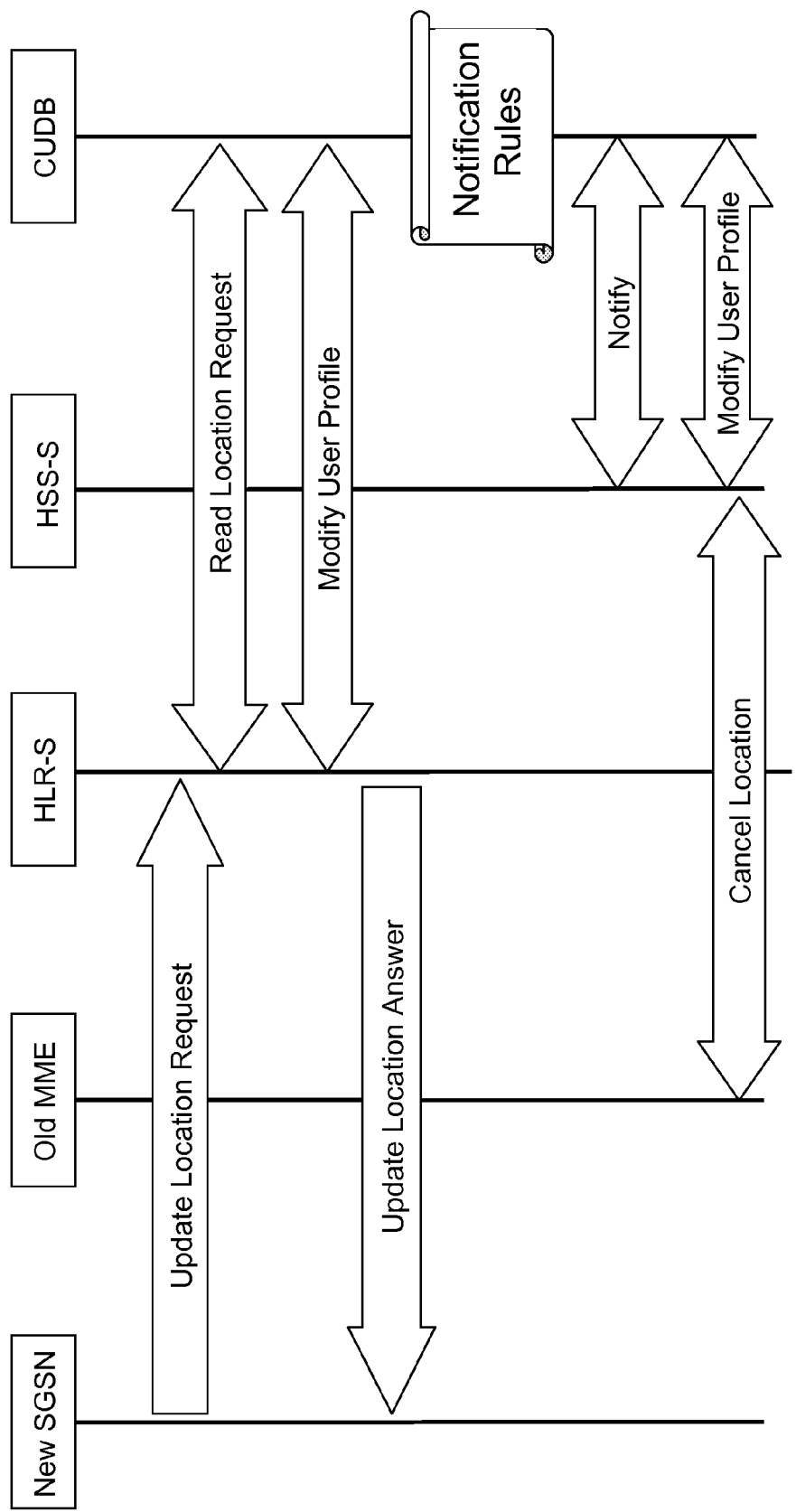
FIG. 7 illustrates signalling associated with an inter-RAT subscriber handover procedure, involving a handover from an MME to an SGSN.

FIG. 7 illustrates at a general level, system signalling associated with a subscriber handover from an (old) MME to a new (SGSN), i.e. associated with the subscriber moving from a LTE access to a 2G/3G access. This assumes that the involved SGSN and MME are separate entities, and that ISR does not apply, and requires that the CUDB apply the first rule listed in Table 1 below.

At step 1, the new SGSN sends an Update Location Request to the HLR-S. At step 2, the HLR-S reads the user profile for the concerned subscriber, from the CUDB. The HLR-S writes a modified user profile to the CUDB at step 3, including the new SGSN address, and at step 4 the HLR-S sends an Update Location Answer to the new SGSN. Meanwhile, at step 5, the CUDB applies the notification rules set to the subscriber profile and the event, i.e. new SGSN address. In accordance with the first listed rule in Table 1, the CUDB will send a notification to the LTE domain, i.e. to the HSS-S, step 6. The notification will provide the notification reason, the concerned subscriber IMSI, and the old subscriber location address, i.e. the MME address. On reception of the notify request, the HSS-S will at step 7 send a modify user profile request to the CUDB to cancel the old MME address. In addition, at step 8, the HSS-S will initiate the Cancel Location procedure towards the old MME.

Figure 8:
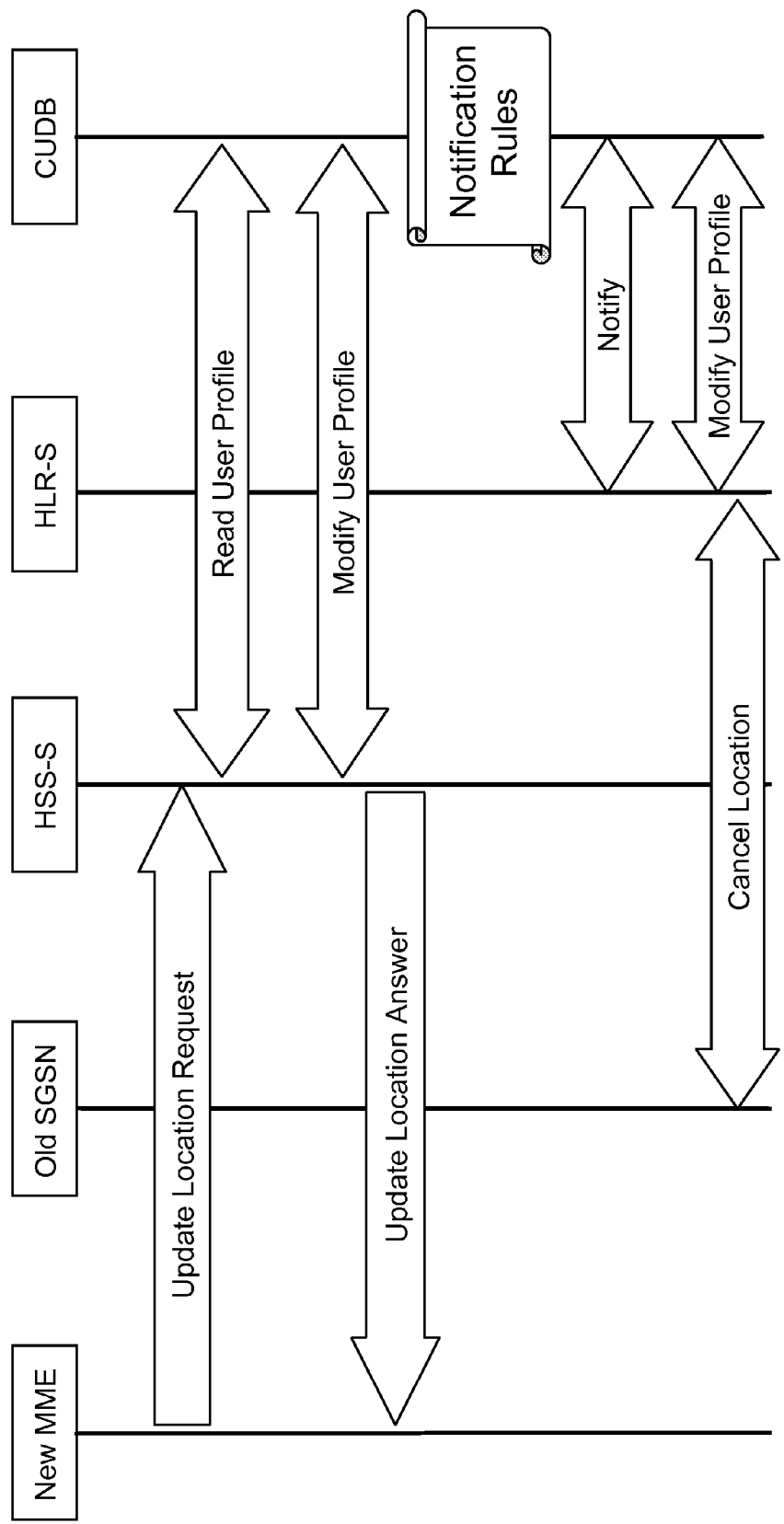
FIG. 8 illustrates signalling associated with an inter-RAT subscriber handover procedure, involving a handover from an SGSN to an MME.

FIG. 8 illustrates at a general level, system signalling associated with a subscriber handover from an (old) SGSN to a (new) MME, i.e. associated with the subscriber moving from a 2G/3G access to a LTE access. This again assumes that the involved SGSN and MME are separate entities, and that ISR does not apply, and requires that the CUDB apply the third rule listed in Table 1 below.

At step 1a, the new MME sends an Update Location Request to the HSS-S. At step 2a, the HSS-S reads the user profile for the concerned subscriber, from the CUDB. The HSS-S writes a modified user profile to the CUDB at step 3a, including the new SGSN address, and at step 4a the HSS-S sends an Update Location Answer to the new MME. Meanwhile, at step 5a, the CUDB applies the notification rules set to the subscriber profile and the event, i.e. new SGSN address. In accordance with the third listed rule in Table 1, the CUDB will send a notification to the 2G/3G domain, i.e. to the HLR-S, step 6a. The notification will provide the notification reason, the concerned subscriber IMSI, and the old subscriber location address, i.e. the SGSN address. On reception of the notify request, the HLR-S will at step 7a send a modify user profile request to the CUDB to cancel the old SGSN address. In addition, at step 8a, the HLR-S will initiate the Cancel Location procedure towards the old SGSN.

Figure 9:
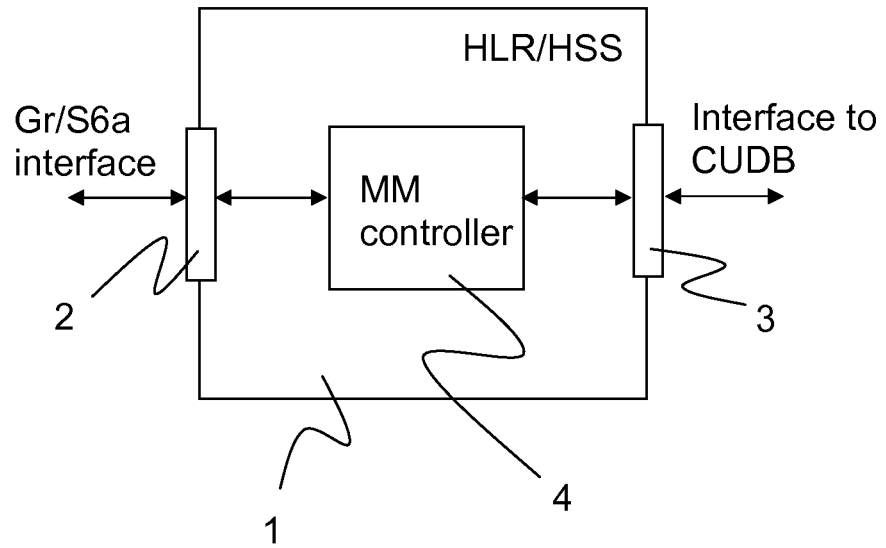
FIG. 9 illustrates schematically a mobility management gateway (HLR-S/HSS-S)

FIG. 9 illustrates schematically a subscriber server 1 that may be an HLR or HSS. The subscriber server comprises a first interface 2 for communicating, via an appropriate network (not shown), with a first access network such as a 2G/3G packet switched access network or a LTE packet switched access network. In the former case, the server 1 exchanges mobility management signalling with one or more SGSNs, and the latter case exchanges signalling information with one or more MMEs. The server 1 also comprises a second interface 3 for communicating with a backend database or CUDB. The server 1 further comprises a mobility management (MM) 4 controller that is responsible for sending and receiving location update signalling via said first interface as per FIGS. 7 and 8, for updating subscriber profiles stored in the CUDB, and for handling notifications received from the CUDB, on said second interface, as described above.

Figure 10:
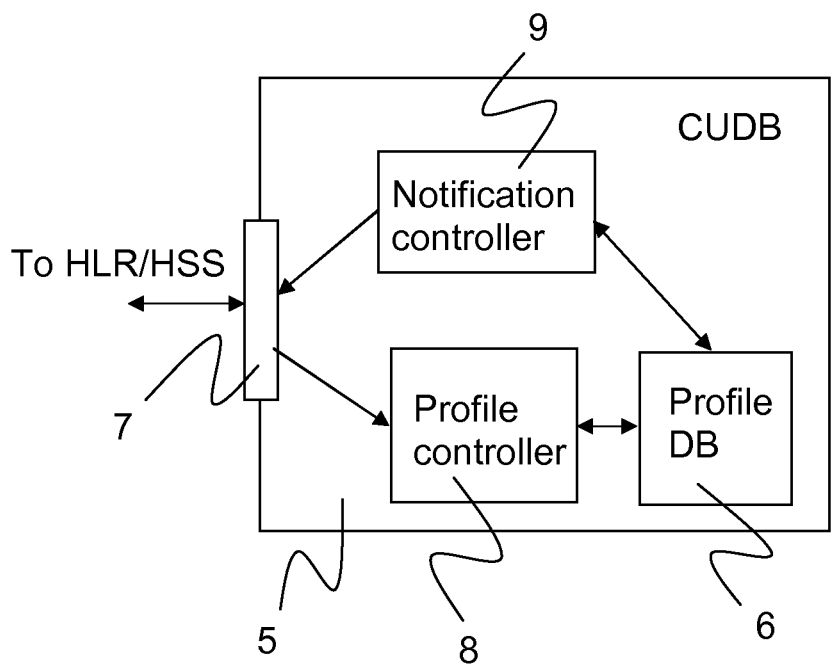
FIG. 10 illustrates schematically a common user database (CUDB)

FIG. 10 illustrates schematically a common user database or CUDB 5 suitable for providing a backend database in a layered HLR/HSS architecture. The CUDB comprises a subscriber profile database 6 for storing subscriber profiles including, for each registered subscriber, one or more current locations being identities of serving mobility management gateways with an access network or networks. The CUDB further comprises an interface 7 for communicating with a plurality of front end servers including HLR-Ss and HSS-Ss.

A profile controller 8 is provided and is responsive to receipt of a profile modification request from a front end server to update, in said subscriber profile database 6, a profile of the relevant subscriber in order to record a mobility management gateway (SGSN or MME) within an access domain as a current location of the subscriber. A notification controller 9 is provided for applying a notification rule set to the (modified) subscriber profile to determine whether or not a notification to cancel a location for said subscriber must be sent to a mobility management gateway within an (old) access domain and, if so, for sending a notification to this effect to an associated front end server, via said interface.

Figure 11:
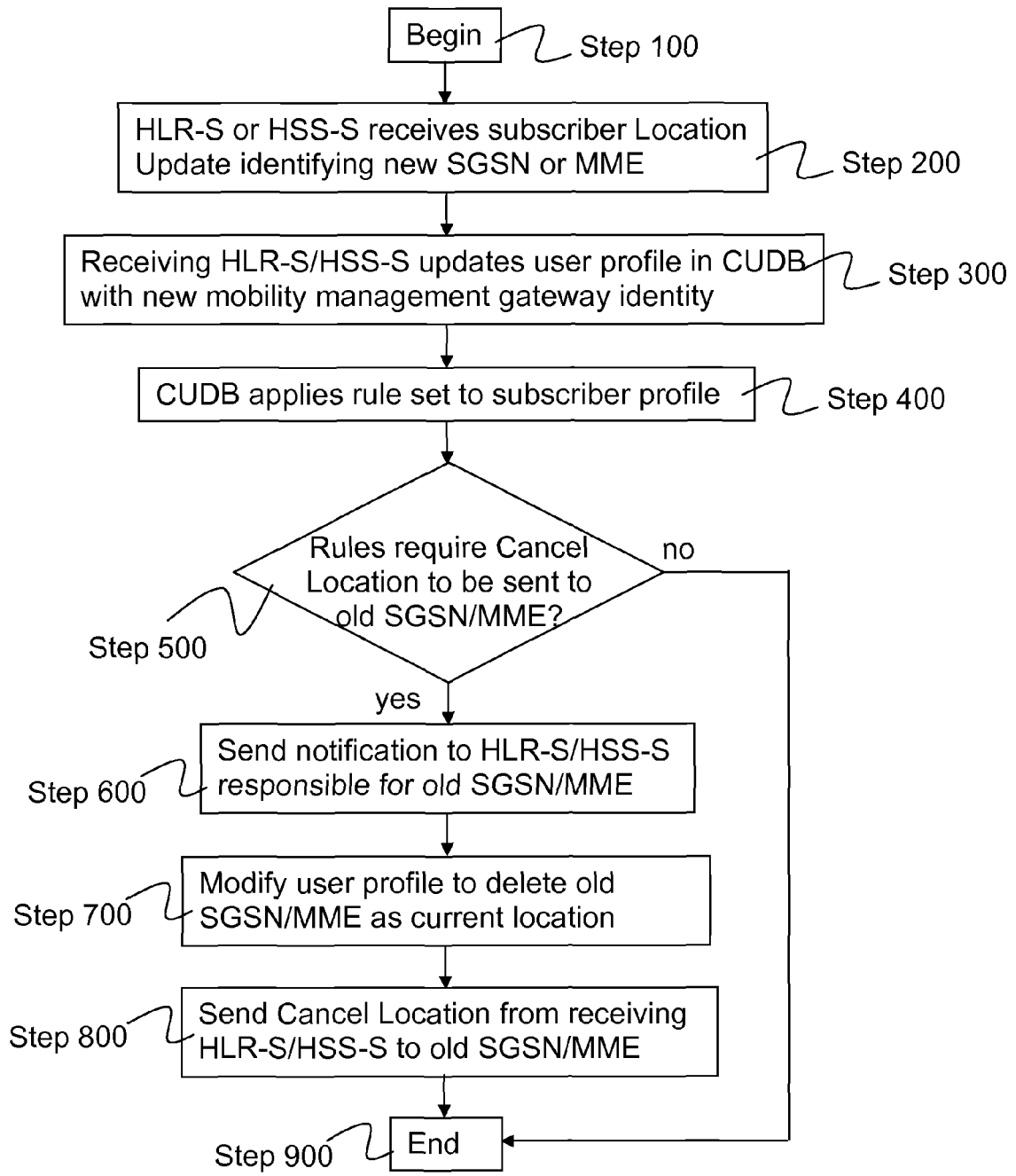
FIG. 11 is a flow diagram illustrating a process for handling an inter-RAT subscriber handover.

FIG. 11 is a flow diagram illustrating the main steps in the relocation process described above. The process begins at step 100, and at step 200, one of the HLR-S and HSS-S receives a subscriber Location Update from the relevant mobility management gateway (either SGSN or MME). At step 300 the HLR-S/HLR-S updates the subscriber's profile in the CUDB. The CUDB, at step 400, applies the notification rule set to the modified profile. If, at step 500, the rules do not require a Cancel Location to be sent to the old SGSN/MME, then the process ends at step 900. However, if it is determined at step 500 that a Cancel Location should be sent to the old SGSN/MME, then at step 600, the CUDB sends an appropriate notification to the HLR-S/HSS-S responsible for that old SGSN/MME. At step 700, this notification is received by the "old" HLR-S/HSS-S, which in turn updates the subscriber profile in the CUDB to delete the address of the old SGSN/MME. At step 800, the "old" HLR-S/HSS-S sends a Cancel Location to the old SGSN/MME. The process then ends at step 900.

The approach described above takes advantage of the HLR and HSS layered architecture to support mobility management between 2G/3G and LTE access. The interoperability between both domains is managed via the back-end database. The back-end database will monitor the user location address changes, implement a simple set a notification rules, and send a notification to the appropriate domain.

Figure 1:
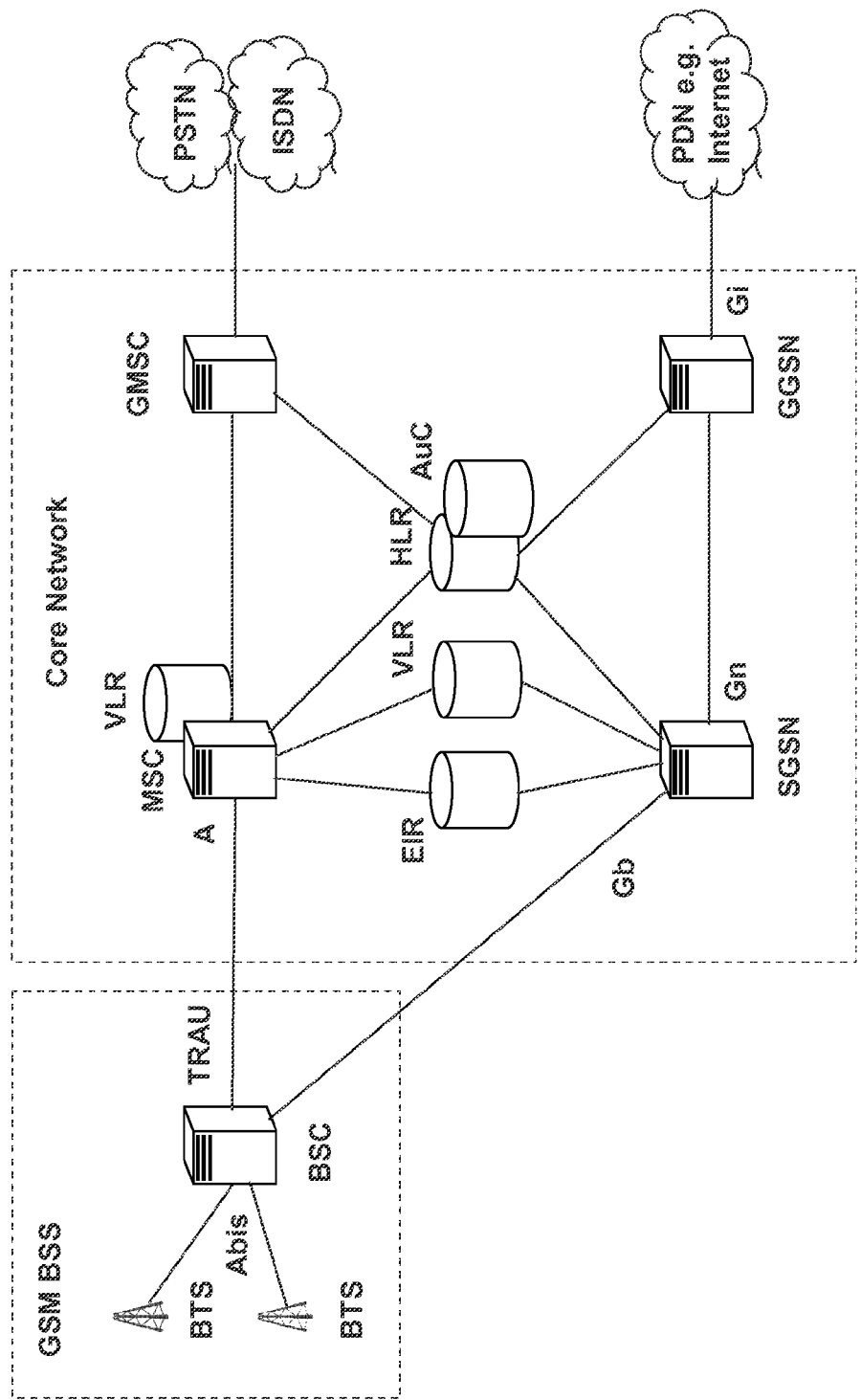
FIG. 1 illustrates schematically a 2G system architecture.
Figure 2:
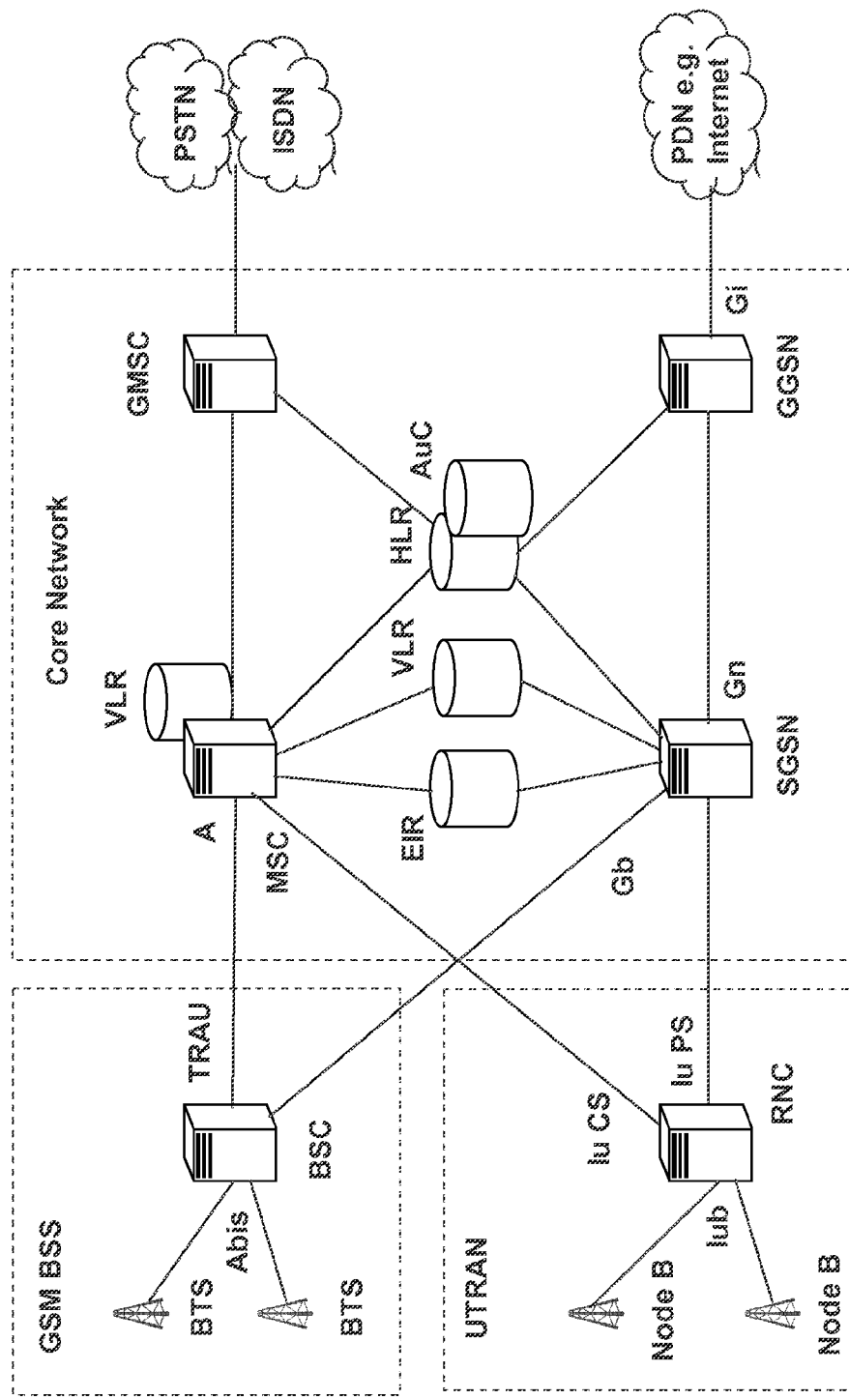
FIG. 2 illustrates schematically a combined 2G/3G system architecture.
Figure 3:
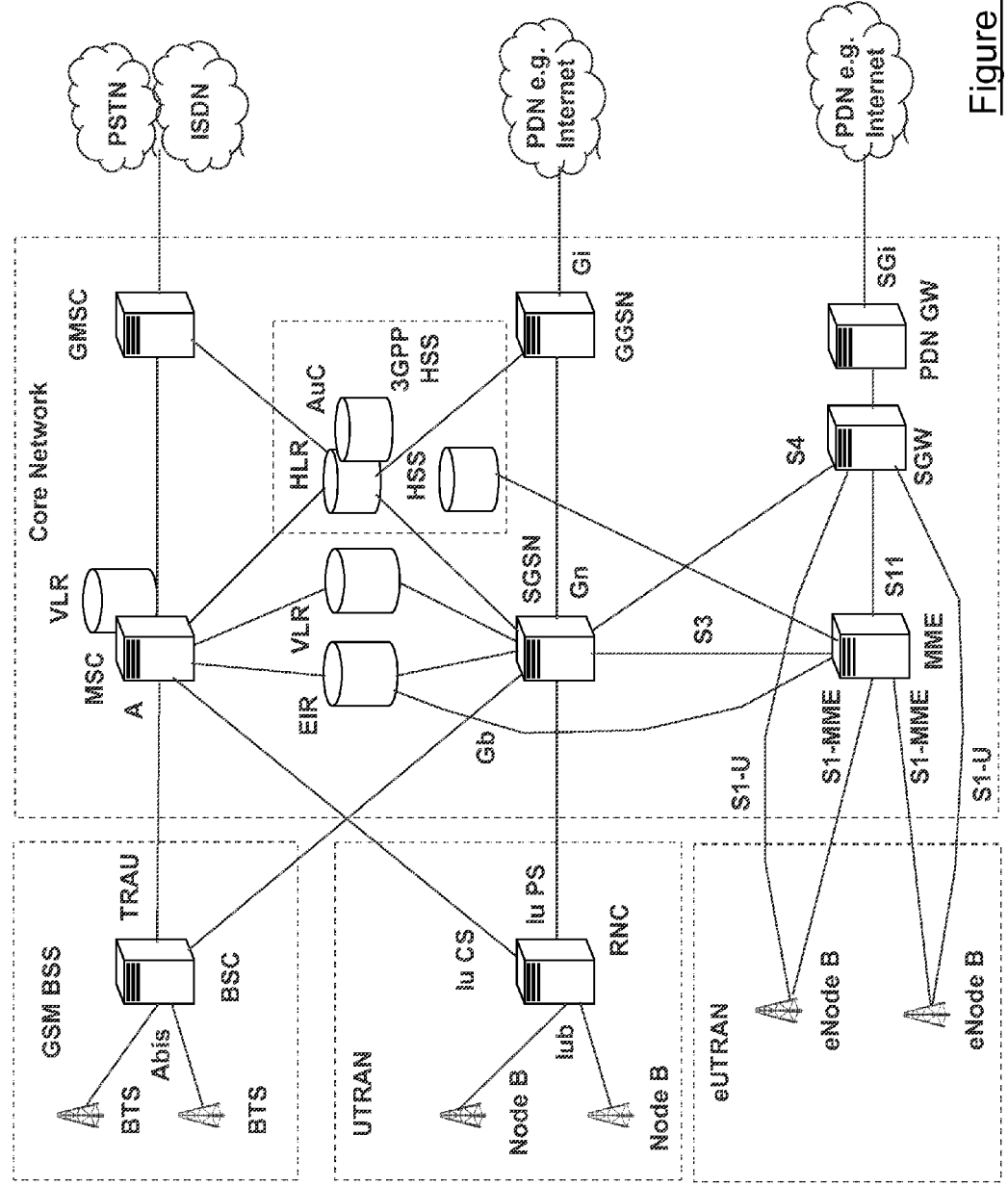
FIG. 3 illustrates schematically a LTE system architecture.
Figure 4:
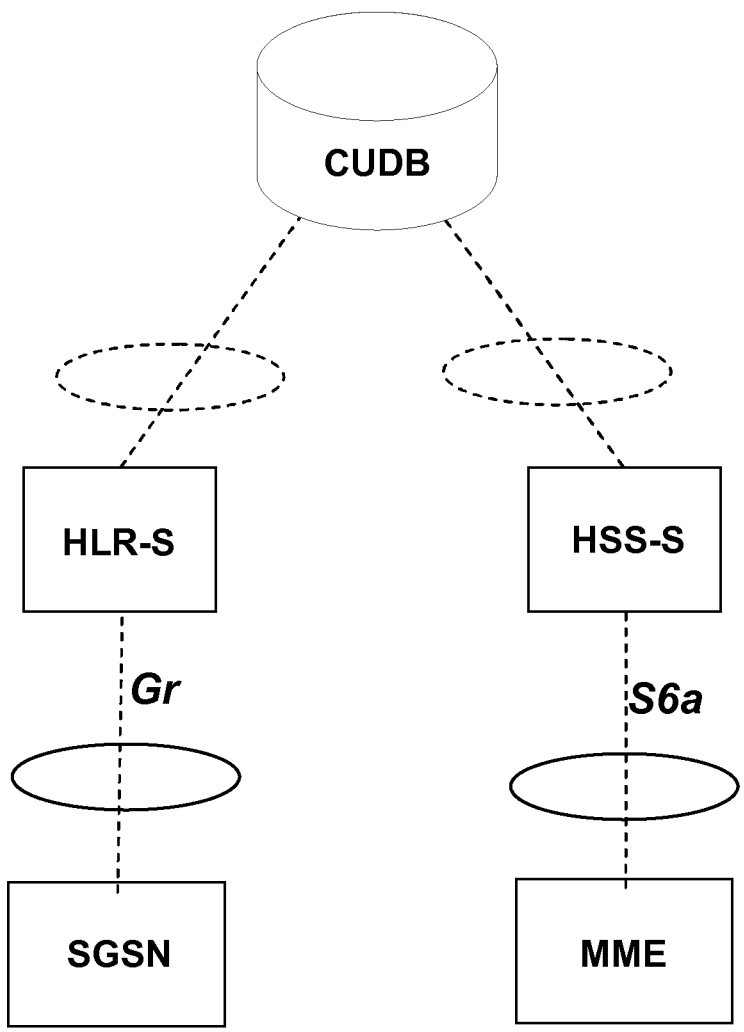
FIG. 4 illustrates a data layered architecture for an HLR and HSS.
Figure 5:
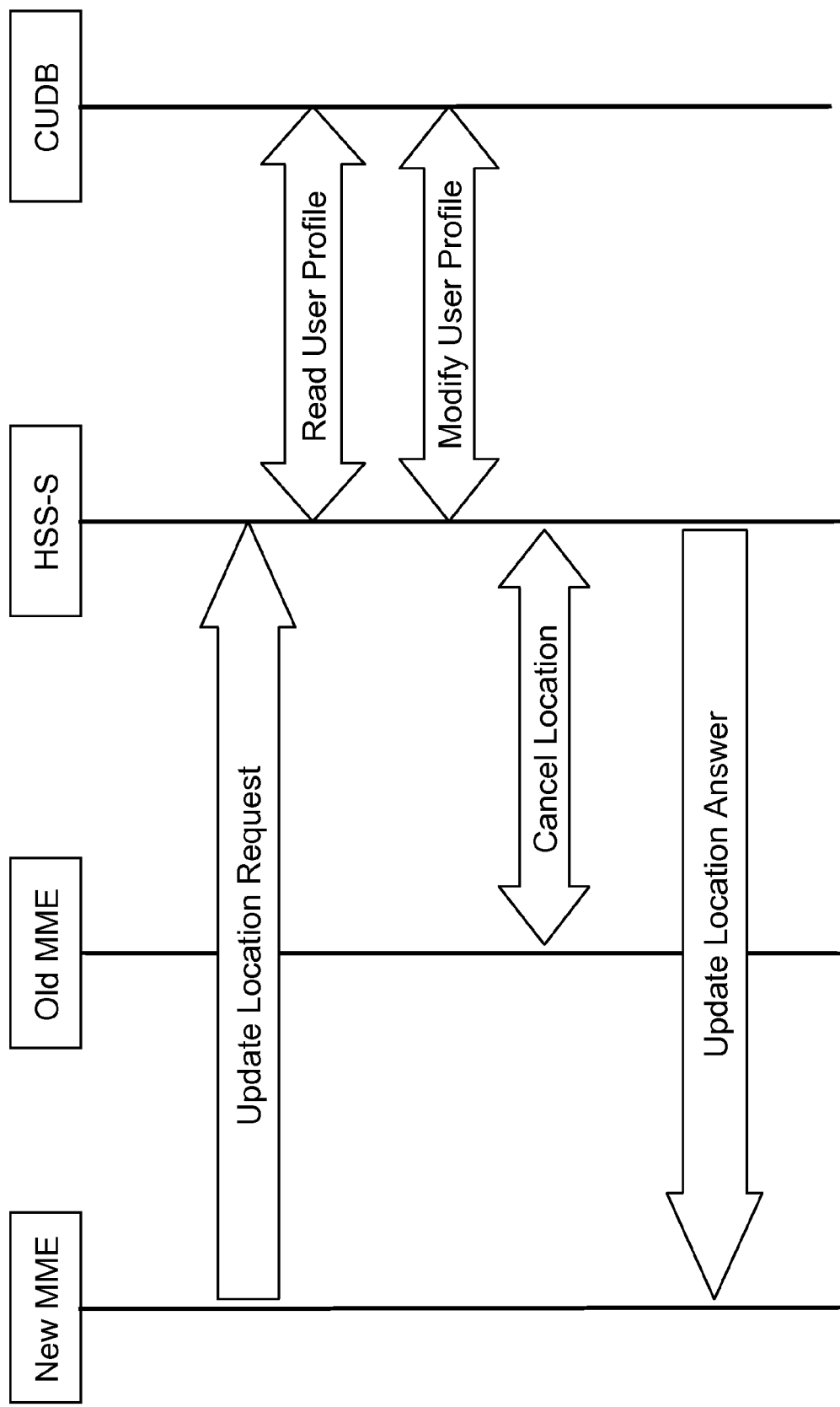
FIG. 5 illustrates signalling associated with a known inter-MME subscriber handover procedure.
Figure 6:
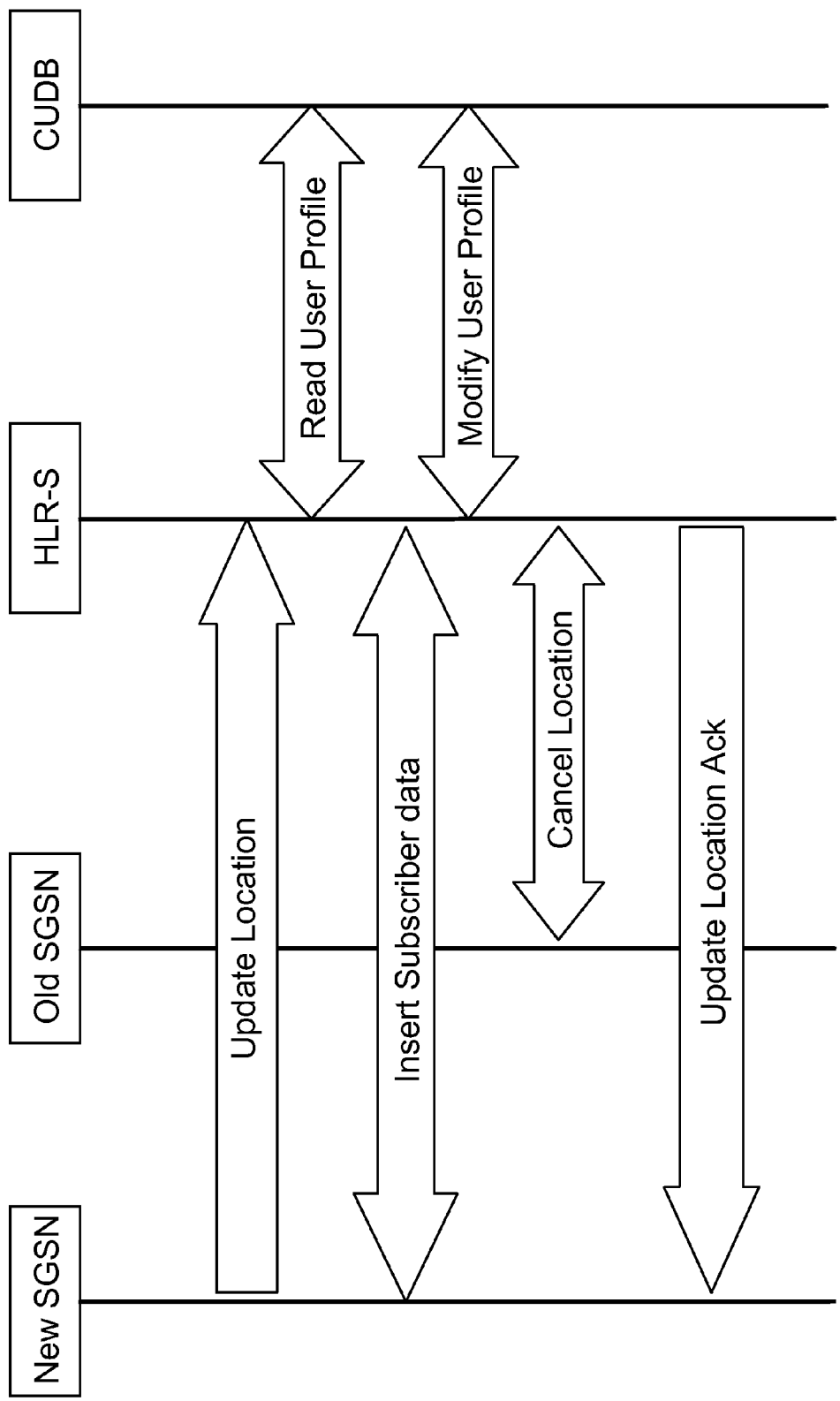
FIG. 6 illustrates signalling associated with a known inter-SGSN subscriber handover procedure.

It will be appreciated by the person of skill in the art that various modifications may be made to the above described embodiment without departing from the scope of the present invention. Examples include:

Rather than the centralised server approach of FIG. 4, using a single HSS-S and a single HLR-S, the architecture may involve a distributed HSS/HLR spread across a number of "paralleled" HSS-Ss and HLR-Ss, coupled to a common back-end database (CUDB).

Further rules may be added to the rules set described (see Table 1).

The approach described is not only applicable to a handover between two packet switched access domains. For example, it could also be applied to a handover between a circuit switched (CS) access domain, e.g. a GSM CS domain, and a packet switched access domain. In this case, the gateway within the CS domain handling mobility would be a Mobile Switching Centre (MSC). Consider for example the handover of a voice call from a CS domain to a LTE access domain supporting Voice Over IP (VoIP). The MME in the LTE access domain would be responsible for sending an Update Location Request to its HSS-S, which in turn, via the CUDB, would cause a Cancel Location to be sent to the MSC in the CS access domain.

TABLE 1

| | | | | Conditions & Action | | | |
|---|---|---|---|---|---|---|---|
| Events | MME address | SGSN address | ISR applies | MME/SGSN configuration | Action | Notification data | |
| SGSN address changes | known | n/a | no | standalone | Notify HSS-S | Notification Reason Concerned User IMSI MME Address | |
| | any other value | n/a | any other value | any other value | none | n/a | |
| MME address changes | n/a | known | no | standalone | Notify HLR-S | Notification Reason Concerned User IMSI SGSN Address | |
| | n/a | any other value | any other value | any other value | none | n/a | |

The invention claimed is:

1. A method of managing subscriber mobility within a telecommunications system having at least first and second access domains supporting respective different access technologies, each of which access domains comprises one or more mobility management gateways responsible for mobility management within the access domain, the method comprising:
    receiving at a first subscriber server within said system, an update location request from a mobility management gateway within said first access domain, the first subscriber server being responsible for said first access domain;
    updating at a common user database, a profile of a subscriber to which said update location request relates in order to record said mobility management gateway within said first access domain as a current location of the subscriber;

at said common user database, applying a notification rule set to the subscriber profile to determine whether or not a notification to cancel a location for said subscriber must be sent to a mobility management gateway within said second access domain; and if so, then sending a notification from said common user database to a second subscriber server within said system, the second subscriber server being responsible for said second access domain, receiving the notification at said second subscriber server, sending a cancel location request to said mobility management gateway within said second access domain, and performing a further update of said subscriber profile in the common user database to remove said mobility management gateway within said second access domain as a current location of the subscriber.

2. A method according to claim 1, wherein one of said first and second access domains supports a packet switched access technology and the other of said first and second access domains supports a packet switched access technology or a circuit switched access technology.

3. A method according to claim 1, wherein both said first and second access domains support a packet switched access technology.

4. A method according to claim 3, wherein one of said first and second access domains supports a 2G/3G packet switched access technology and the other of said first and second access domains supports a LTE-based packet switched access technology.

5. A method according to claim 4, wherein said mobility management gateway within said first access domain is one of a Serving GPRS Support Node and a Mobility Management Entity, and said mobility management gateway within said second access domain is the other of a Serving GPRS Support Node and a Mobility Management Entity.

6. A method according to claim 4, wherein said first subscriber server is one of a Home Location Register and a Home Subscriber Server, and said second subscriber server is the other of a Home Location Register and a Home Subscriber Server, the Home Location Register and the Home Subscriber Server being configured in a layered architecture with said common user database.

7. A method according to claim 4, wherein said notification rule set includes an Idle mode Signalling Reduction rule or rules directing that no cancel location request be sent to said mobility management gateway within said second access domain if that gateway supports Idle mode Signalling Reduction.

8. Apparatus configured to provide a common user database for storing profiles of respective subscribers of a telecommunications system, the apparatus comprising:

a subscriber profile database;

an interface for communicating with a first subscriber server, the first subscriber server being responsible for subscriber mobility within a first access domain supporting a first access technology, and with a second subscriber server, the second subscriber server being responsible for subscriber mobility within a second access domain supporting a second access technology;

a profile controller responsive to receipt of a profile modification request from said first subscriber server, via said interface, and pertaining to a subscriber being handed over from said second to said first access domain, to update, in said subscriber profile database, a profile of said subscriber in order to record a mobility management gateway within said first access domain as a current location of the subscriber; and a notification controller for applying a notification rule set to the subscriber profile to determine whether or not a notification to cancel a location for said subscriber must be sent to a mobility management gateway within said second access domain and, if so, for sending a notification via said interface to said second subscriber server to cause a cancel location request to be sent to said mobility management gateway within said second access domain.

9. Apparatus according to claim 8, said notification rule set comprising at least the following rules:

a) if the address of said mobility management gateway within said second access domain is contained within said profile, and b) Idle Mode Signalling Reduction does not apply, and c) said mobility management gateways within said first and second access domains are standalone nodes, then send a notification to said second subscriber server;

if one or more of a), b) and c) are false or otherwise not applicable, then do not send a notification to said second subscriber server.

10. Apparatus according to claim 8, said profile controller being further responsive to receipt of a profile modification request from said second subscriber server, via said interface and following the sending of a said notification from the apparatus to said second subscriber server, to update, in said subscriber profile database, a profile of said subscriber in order to cancel a mobility management gateway within said second access domain as a current location of the subscriber.

11. Apparatus according to claim 8, said interface being configured to communicate with said first subscriber server as one of a Home Location Register of a 2G/3G packet access domain and a Home Subscriber Server of a LTE packet access domain, and with said second subscriber server as the other of a Home Location Register of a 2G/3G packet access domain and a Home Subscriber Server of a LTE packet access domain.

12. Apparatus configured to provide a subscriber server responsible for mobility management of subscribers within a first access domain supporting a first access technology, the apparatus comprising:

a first interface for communicating with a mobility management gateway within said first access domain;

a second interface for communicating with a common user database storing subscriber profiles;

a mobility management controller for receiving from said common user database, via said second interface, a notification that a subscriber is being handed off to a mobility management entity within a second access domain supporting a second access technology, and for responding by sending a cancel location request in respect of said subscriber to said mobility management gateway within said first access domain, via said first interface.

13. Apparatus according to claim 12, said mobility management controller being further responsive to receipt of said notification to modify a subscriber profile stored at said common user database, via said second interface, by deleting said mobility management gateway within said first access domain.

14. Apparatus according to claim 12, wherein said apparatus is a Home Location Register of a 2G/3G access domain.

15. Apparatus according to claim 12, wherein said apparatus is a Home Subscriber Server of a LTE access domain.

* * * * *

UNITED STATES PATENT AND TRADEMARK OFFICE
CERTIFICATE OF CORRECTION

PATENT NO. : 8,711,822 B2  
APPLICATION NO. : 13/262849  
DATED : April 29, 2014  
INVENTOR(S) : De Vega De La Red Page 1 of 1

It is certified that error appears in the above-identified patent and that said Letters Patent is hereby corrected as shown below:

In the Specification

In Column 2, Line 22, delete ""dateless"" and insert -- "dataless" --, therefor.

Signed and Sealed this
Twenty-third Day of September, 2014

Michelle K. Lee
*Deputy Director of the United States Patent and Trademark Office*